United States Patent [19]

Young

[11] Patent Number: 5,260,606

[45] Date of Patent: Nov. 9, 1993

[54] HIGH EFFICIENCY SQUAREWAVE VOLTAGE DRIVER

[75] Inventor: Willard A. Young, Brampton, Canada

[73] Assignee: Litton Systems Canada Limited, Etobicoke, Canada

[21] Appl. No.: 829,781

[22] Filed: Jan. 31, 1992

[51] Int. Cl.$^5$ .............................................. G09G 3/00
[52] U.S. Cl. .................................. 307/139; 307/113; 361/246; 345/211
[58] Field of Search ............... 307/139, 112, 113, 138; 361/245, 246, 155, 156; 320/1; 363/132; 315/244, 209 R, DIG. 7; 359/245; 340/811, 762, 785, 784, 789

[56] References Cited

U.S. PATENT DOCUMENTS

| | | | |
|---|---|---|---|
| 4,033,673 | 7/1977 | Seki | 340/785 |
| 4,201,984 | 5/1980 | Inami et al. | 340/785 |
| 4,201,985 | 5/1980 | Inami et al. | 340/811 |
| 4,236,107 | 11/1980 | Templin | 320/21 |
| 4,431,989 | 2/1984 | Grange et al. | 340/785 |
| 4,573,006 | 2/1986 | Newton | 320/1 |
| 4,618,218 | 10/1986 | Shaw et al. | 359/360 |

Primary Examiner—Howard L. Williams
Assistant Examiner—Richard T. Elms
Attorney, Agent, or Firm—Edmund W. Rusche

[57] ABSTRACT

Presented is a device and method for providing a means of driving capacitive cells, such as those comprising suspended particle light valve windows, with a squarewave voltage signal at a select frequency with high efficiency and low power requirements. The invention uses an inductive circuit in parallel with the capacitive load of the capacitive cell, a dc voltage source, and a fast switching means connected to timely control the polarity of the voltage source to the capacitive cell.

7 Claims, 2 Drawing Sheets

HIGH EFFICIENCY SQUAREWAVE VOLTAGE DRIVER

BACKGROUND OF THE INVENTION

A suspended particle light valve window consists of a thin cell whose walls consist of glass or plastic sheets coated on their inner surfaces with transparent, electrically conducting films, and which is filled with a suspended particle fluid. The suspended particles within the fluid medium are responsive to the application of an electric field and change the optical properties of the fluid depending on the intensity and polarity of the applied electric field. Such light valves must be electrically excited by applying ac voltage, preferably squarewave, to the two conducting films. Because of their construction, the light valves are electrically capacitive in nature.

Driving them with a conventional power supply is very inefficient because the capacitance must be repeatedly charged, discharged, and recharged with opposite polarity. This can be a serious disadvantage for low-power battery operation. Higher efficiency could be achieved by connecting an inductor to the cell, and operating the cell in a resonant circuit at the drive frequency. However, the waveform in this case would be sinusoidal, not square.

It is an object of this invention to introduce a voltage drive means and method for powering capacitive suspended particle light valve windows or other capacitive circuits or cells, and which requires low power level and produces an efficient squarewave voltage cycle.

It is a further object of this invention to utilize an LC circuit to efficiently deliver a square wave voltage signal across a capacitive suspended particle light valve window or other capacitive circuit or cell using a low power dc primary voltage source.

SUMMARY OF THE INVENTION

The invention provides a means of driving capacitive cells, such as those comprising suspended particle light valve windows, with a squarewave voltage signal at a select frequency with high efficiency and low power requirements. The invention uses an inductive circuit in parallel with the capacitive load of the capacitive cell, a dc voltage source, and a switching means connected to timely control the polarity of the voltage source to the capacitive cell. Energy conservation and rapid polarity reversal is accomplished with the switching means by connecting the capacitive cell with the inductive circuit making an LC circuit during times of making polarity changes.

All switches of the switching means would, in a typical application, be fast electronic switches comprising transistors, field effect transistors and other microelectronic or optoelectronic devices. They are operated and controlled by a computerized timing circuit. With the capacitive light valve cell represented by a capacitance C, and the inductance of the parallel circuit by L, the LC circuit formed by the switching means has a resonant frequency $f_{LC}=\frac{1}{2}\pi\sqrt{LC}$, which is chosen to be higher (greater) than that of the squarewave voltage required to drive the light valve.

DESCRIPTION OF THE PREFERRED EMBODIMENT

The invention, in general, comprises a dc power source, a capacitive light valve window, an inductance connected in parallel with the light valve, a first switching means for connecting or disconnecting the inductance from the light valve, a second switching means connected between the light valve and the power source for reversing polarity to the light valve window, and a timing and control means for operating the switching means to a predetermined duty cycle. The preferred duty cycle is a cyclical squarewave which is optimized for operation of the light valve window.

Figure 1:
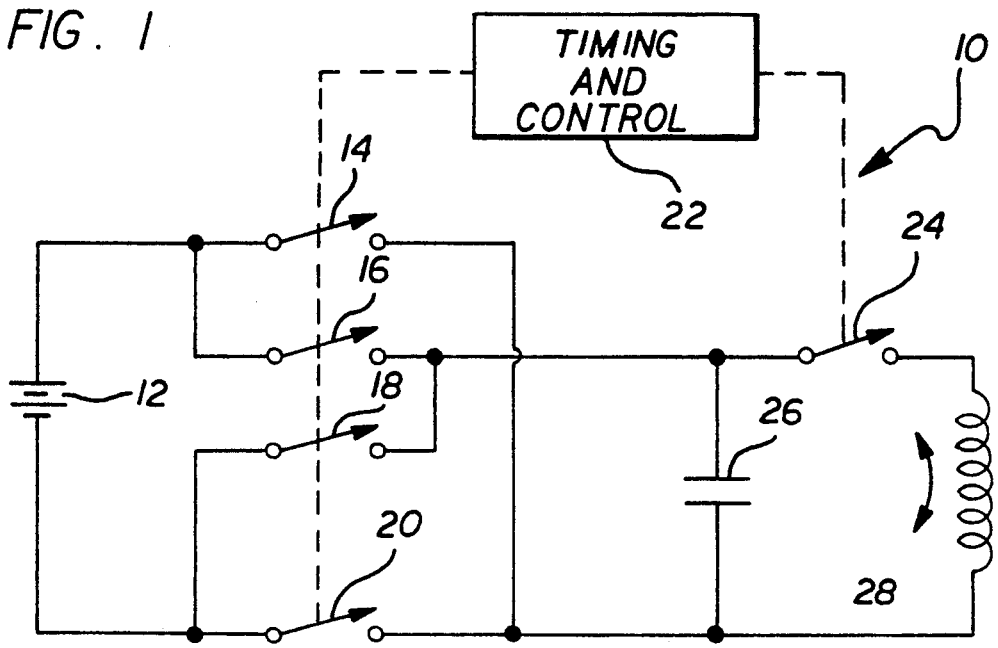
FIG. 1 shows a simplified schematic of the equivalent circuit for the invention.

A preferred embodiment is shown in FIG. 1. The squarewave driver circuit 10 is shown comprising a dc power source 12, connected through switches 14, 16, 18, and 20 to light valve 26. An inductance 28 is connected via switch 24 in parallel with light valve 26. A timing and control unit 22 is connected to provide programmed control of the operation of switches 14, 16, 18, 20, and 24. In a typical application, all switches will be fast electronic switches.

Figure 2:
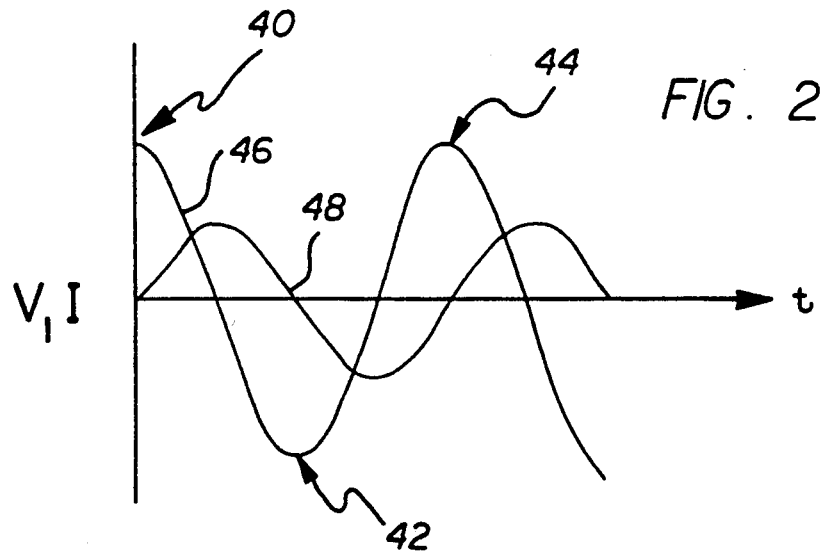
FIG. 2 is a voltage and current plot for an ideal LC circuit at resonance.

The light valve 26, being capacitive and connected in parallel with inductance 28, forms an LC circuit with inductance 28 when switch 24 is closed. The resonant frequency of this circuit is $f_{LC}=\frac{1}{2}\pi\sqrt{LC}$. FIG. 2 shows an ideal plot for the voltage 46 and current 48 as functions of time for this LC circuit if it were allowed to oscillate freely without loss.

Figure 3:
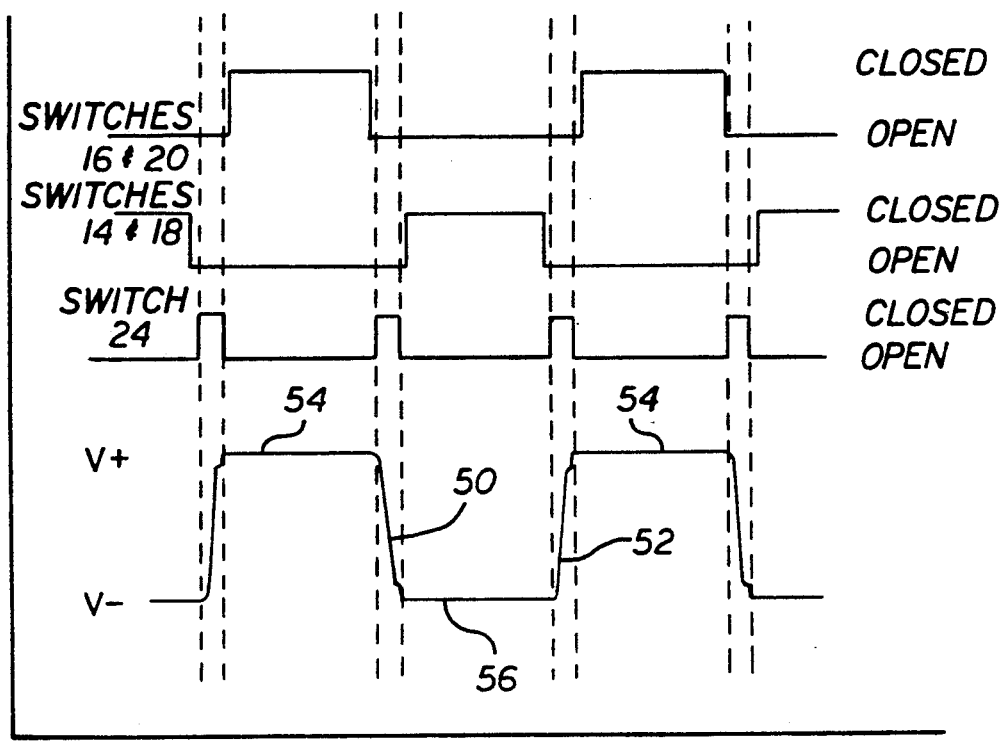
FIG. 3 shows the timing for the switches and the generated squarewave voltage applied to the light valve shutter.

The cyclical voltage desired to be applied at light valve 26 is shown in FIG. 3. It is preferable that the voltage at light valve 26 be at some predetermined level $+V$, 54, for a half cycle, and then reversed to $-V$, 56, for the remaining half cycle. This procedure is repeated at some predetermined frequency $f_o$ to establish the desired continuous squarewave voltage signal. The voltage level V, of course, is the level selected for dc power source 12. Switching polarity of the voltage level at 50 and 52 is desired to be close to simple step changes.

To accomplish rapid approximation to simple step changes at 50 and 52, and at a minimum of expended energy, it is necessary to adjust the LC circuit to have a resonant frequency $f_{LC}$ chosen to be significantly greater than $f_o$, perhaps by ten times or more. If we assume initially that controller 22 has all switches open except for switches 16 and 20, then light valve 26 is charged to power source voltage $+V$. This corresponds to the point 40 in FIG. 2 and to the level 54 in FIG. 3. Switches 16 and 20 are kept closed by controller 22 for the desired half period of the squarewave drive signal to light valve 26. During this time the capacitance of light valve 26 is fully charged.

Then switches 16 and 20 are opened to remove source 12 from the capacitive cell 26. Immediately thereafter switch 24 is closed. The LC circuit is now formed and will start to "resonate" or "ring", with the voltage across light valve 26 falling along voltage curve 46 in FIG. 2, passing through zero, and ideally reach the value $-V$ at point 42 in FIG. 2. In reality, because of losses in the resonant circuit, the voltage reached at point 42 will be numerically somewhat less than the ideal value of $-V$. Now controller 22 opens switch 24 and the LC circuit has oscillated through one half cycle of its resonant frequency $f_{LC}$. What has been achieved is a reversal of the polarity of the voltage on the capacitance of light valve 26 with only a small loss of stored energy and voltage due to the resistance of the LC circuit.

Immediately after opening switch 24, the controller 22 closes switches 14 and 18. This reconnects power source 12 to light valve 26 again, but with opposite polarity. The capacitance of light valve 26 is now charged fully to the voltage $-V$, 56 in FIG. 3, thereby making up for the small loss of energy which occurred during the voltage reversal cycle.

Now controller 22 keeps all switches open except for switches 14 and 18 for the second half period of the squarewave drive signal to light valve 26. At the end of this period switches 14 and 18 are opened and switch 24 is immediately thereafter closed by controller 22. This allows the LC resonant circuit to execute the next half cycle of its oscillation from point 42 to point 44 in FIG. 2, reversing the voltage across the capacitance of light valve 26 and bringing it back, ideally, to $+V$.

Again, controller 22 opens switch 24 at completion of this half cycle for the LC circuit, i.e., at point 44 of FIG. 2, and immediately thereafter closes switches 16 and 20 to start the squarewave cycle over again. At this point we have returned to the starting point of the square wave cycle; one full cycle of the squarewave drive signal on light valve 26 has been completed, and one full cycle of the LC resonant circuit has been completed, with each segment of the square wave cycle carefully timed and formed.

Half cycles of the sinusoidal waveform of the LC resonant circuit make up the quasi-step transitions of the squarewave drive voltage, as shown at points 50 and 52, in FIG. 3. The drive voltage of FIG. 3 is not a perfect or true squarewave, but is an excellent approximation to a squarewave drive signal needed for light valve 26, provided that $f_{LC}$ is sufficiently higher than $f_o$.

This process is repeated under timing and control of the controller 22 to generate a continuous desired squarewave drive signal for light valve 26 at a high efficiency and with the capability of design for low power, portable operation. It should be further noted that switch 24 is always operated at times when the current in the LC circuit is zero because the LC loop current is 90° out phase with the voltage as shown by the current and voltage curves in FIG. 2.

Figure 4:
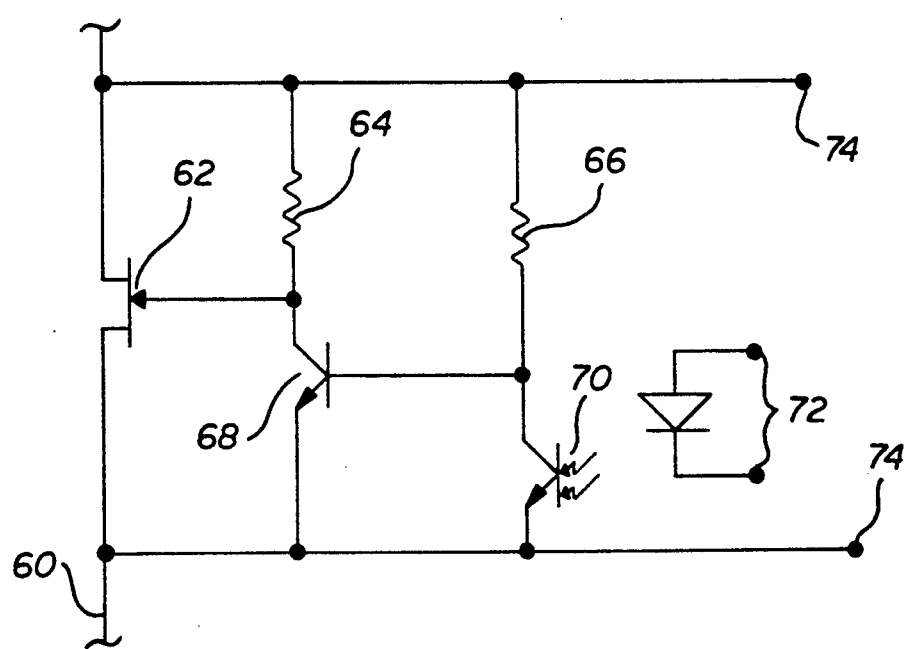
FIG. 4 shows an embodiment of an optoelectronic switch circuit.

FIG. 4 shows an embodiment for the structure of an optoelectronic switching circuit to serve as one of the switches in the invention. This circuit is comprised of a FET 62, a npn transistor 68, a high speed opto coupler 70, and resisters 64 and 66. The circuit to be controlled by the switch is represented by 60. The power source 12 connections are terminals 72, and connection to the timing and control means 22 occurs through terminals 72. In this embodiment the FET was an IRF530 transistor, the non transistor 68 was a 2N2222, and the opto coupler was an ISO6 6N136 device. To those skilled in the art it is clear that there are other choices of equivalent embodiments to accomplish the high speed switching required in the invention.

The preferred embodiment presented herein has focused on the development of a squarewave voltage driver; however, it should be clear that controller 22 is capable of being programmed to develop other waveform signals dependent only upon the choice of the components involved in this invention. While these specific embodiments of the invention herein have been illustrated and described in detail, it will be appreciated that the invention is not limited thereto, since many modifications may be made by one skilled in the art which fall within the true spirit and scope of the invention.

What is claimed is:

1. A high efficiency voltage driver for a capacitive cell such as a suspended particle light valve window which comprises:
    a dc power source;
    a capacitive cell;
    an inductance connected in parallel with the capacitive cell;
    a first switching means positioned between said capacitive cell and said inductance for connecting or disconnecting said inductance from said capacitive cell;
    a second switching means positioned between said capacitive cell and said power source for connecting and reversing polarity of said dc power source to said capacitive cell; and
    a timing and control means for operating said first and second switching means according to a predetermined switching sequence.

2. A high efficiency voltage driver according to claim 1 wherein said capacitive cell is a suspended particle light valve window.

3. A high efficiency voltage driver according to claim 1 wherein said first and second switching means are fast electronic switches.

4. A high efficiency voltage driver according to claim 3 wherein said timing and control means is a computer.

5. A high efficiency voltage driver according to claim 3 wherein said fast electronic switches are transistors.

6. A high efficiency voltage driver according to claim 3 wherein said fast electronic switches are transistorized circuits.

7. A method for driving a capacitive suspended particle light valve window with an efficient squarewave voltage signal which comprises the steps of:
    providing a dc voltage, V, across said capacitive suspended particle light valve window for one half cycle of a squarewave voltage signal with a predetermined period of frequency, $f_o$;
    disconnecting said dc voltage from said capacitive suspended particle light valve window and immediately thereafter connecting said capacitive suspended particle light valve window to an LC circuit with a predetermined resonant frequency, $f_{LC}$, selected to be higher than the preselected frequency $f_o$ for said squarewave driver;
    allowing said LC circuit to operate for one half of its natural cycle defined by its resonant frequency, $f_{LC}$, thereby allowing the voltage applied to said light valve to be reversed to a value slightly lower in absolute value, because of slight resistive losses in the LC circuit, than the negative of the original voltage applied to said light valve;
    disabling said LC circuit and immediately thereafter connecting in reverse polarity said dc voltage to said capacitive suspended particle light valve window and thereby establishing a dc voltage, $-V$, across said capacitive suspended particle light valve window for a second half of the squarewave period;

disconnecting said inverse dc voltage and immediately thereafter reconnecting said capacitive suspended particle light valve window to said LC circuit;

allowing said LC circuit to operate for one half of its natural cycle defined by its resonant frequency, $f_{LC}$, thereby allowing the voltage applied to said capacitive suspended particle light valve window to again be reversed to a value slightly lower in absolute value, because of slight resistive losses in the LC circuit, than said original voltage applied to said capacitive suspended particle light valve window;

disabling said LC circuit and immediately thereafter reconnecting in original polarity said dc voltage to said capacitive suspended particle light valve window thereby establishing said original dc voltage, V, across said capacitive suspended particle light valve window; and repeating above steps to form a continuous square wave driving voltage signal across said capacitive suspended particle light valve window.

* * * * *